July 24, 1956 W. SHOCKLEY 2,756,285

SEMICONDUCTOR SIGNAL TRANSLATING DEVICES

Filed Aug. 24, 1951

INVENTOR
W. SHOCKLEY
BY

ATTORNEY

United States Patent Office 2,756,285

Patented July 24, 1956

2,756,285

SEMICONDUCTOR SIGNAL TRANSLATING DEVICES

William Shockley, Madison, N. J., assignor to Bell Telephone Laboratories, Incorporated, New York, N. Y., a corporation of New York Application August 24, 1951, Serial No. 243,542

1 Claim. (Cl. 179—171)

This invention relates to semiconductor signal translating devices and more particularly to such devices especially suitable for amplification of electrical signals of high frequencies, for example frequencies of the order of $10^7$ cycles.

One general object of this invention is to provide a structurally simple, rugged translating device capable of efficiently amplifying high frequency electrical signals.

Conduction in semiconductors, as is now known, may be of two kinds, namely extrinsic or intrinsic. Also conduction may be of either of two types, by electrons or by holes. In extrinsic semiconductors, such as germanium or silicon containing significant impurities, the type of conduction is determined by the character of the impurities which are in effective excess. Specifically, in semiconductor materials wherein the donors are in excess, the majority charge carriers are electrons and such materials are denoted as N-type. Conversely, in semiconductors wherein the acceptors are in excess, the majority carriers are holes and such semiconductors are classified as P-type.

The charge carriers, be they holes or electrons, tend to diffuse in the semiconductive body, and drift under the influence of applied electric fields, electrons flowing toward a positive terminal and holes toward a negative terminal. The flow of carriers can be confined to prescribed regions, for example along a surface of the semiconductive body, by appropriate control of the field.

The present invention pertains particularly to translating devices including extrinsic semiconductors which are strongly of one conductivity type or the other, that is N or P, so that only the majority carriers are of practical significance in the conduction process.

Silicon or germanium bodies of either conductivity type, or such bodies containing one or more PN junctions are particularly suitable for use in devices according to this invention. Especially advantageous are single crystal bodies which may be produced for example, by the methods disclosed in the applications Serial No. 138,354, filed January 13, 1950, of J. B. Little and G. K. Teal, now Patent No. 2,683,676, dated July 13, 1954, and Serial No. 168,184, filed June 15, 1950, of G. K. Teal, now Patent No. 2,727,840, dated December 20, 1955. In brief, as disclosed in those applications, a single crystal of germanium is produced by immersing a seed of germanium into a molten mass of germanium and withdrawing the seed at a rate to draw some of the molten mass along therewith. The conductivity and conductivity type of the drawn crystal may be controlled by controlling the kind and concentration of the impurities present in the molten mass. For example, if the mass is of N conductivity type, it may be made more strongly N, i. e., its conductivity may be increased, by adding a donor impurity, such as antimony, to the melt, or it may be made less N or converted to P by adding an acceptor impurity, such as gallium, to the molten mass.

In certain embodiments of this invention, the semiconductive body advantageously is of thin filamentary form. Such bodies may be made, for example, in the manner disclosed in the application Serial No. 50,986, filed September 24, 1948, now Patent 2,560,594 granted July 17, 1951, of G. L. Pearson.

In brief, in devices constructed in accordance with this invention, a thin element of semiconductive material is utilized as one plate of a condenser the capacitance per unit area of which decreases from one end of the element to the other. For convenience of reference, the end at which the capacitance per unit area is the greater will be termed the input end and the other will be termed the output end. Signals are impressed at the input end whereby a surface charge is produced thereat. This charge is transmitted to the output end by virtue of an electric field established longitudinally of the element.

By virue of the difference in capacitance above mentioned, a charge at the output end, equal to that at the input end, correponds to a greater voltage so that, in operation of the device, a power gain is realized.

In one illustrative embodiment of the invention, the semiconductive element is a thin film or filament and the other plate of the condenser is a metal strip or plate overlying the filament and so disposed with respect thereto that the spacing between the two increases in the direction from one end of the filament to the other.

In another illustrative embodiment of the invention, the semiconductive element is a thin zone of one conductivity type forming a longitudinal junction with a zone of the opposite conductivity type in a body of semiconductive material. The junction is biased in the reverse direction and so that, as described in detail hereinafter, the space charge region at the junction increases in thickness longitudinally of the junction whereby the capacitance between the two zones decreases in the direction from one end to the other of the junction.

The invention and the several features thereof will be understood more clearly and fully from the following detailed description with reference to the accompanying drawing in which.

Figure 3:
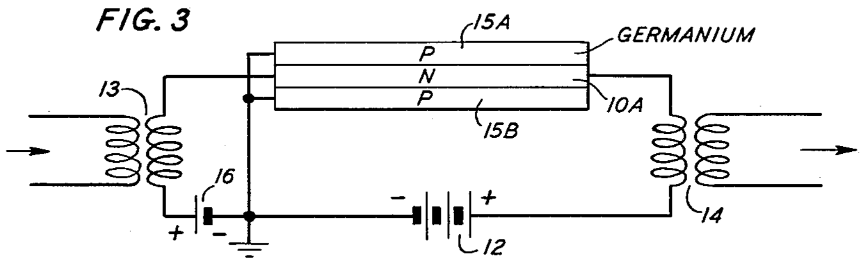
Figure 4:
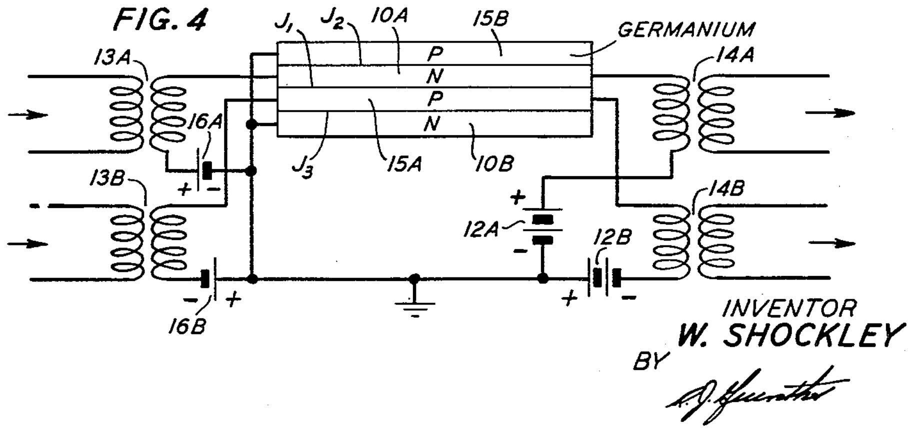

Fig. 3 illustrates another embodiment of this invention wherein the semiconductor body comprises a thin zone or layer of one conductivity type between two zones of the opposite conductivity type; and Fig. 4 illustrates another embodiment of this invention wherein, in operation, charges are induced on two layers of opposite conductivity type in a semiconductive body and tend to flow in the same direction along these two layers.

Figure 1:
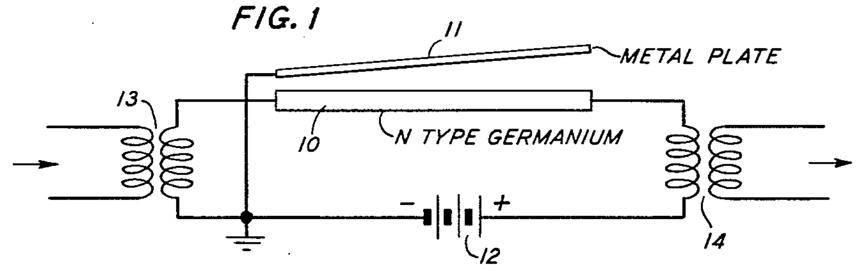
Fig. 1 is in part a diagram and in part a circuit schematic of a signal translating device illustrative of one embodiment of this invention.

Referring now to the drawing, the signal translating device illustrated in Fig. 1 comprises a flat filament 10 of N conductivity type germanium and a metal strip or plate 11 opposite one major face of the filament 10 and inclined relative thereto so that the spacing between the two members 10 and 11 increases from one end of the filament to the other. Thus, the capacitance per unit area between the members 10 and 11 decreases in the direction along the filament, specifically from left to right in Fig. 1.

Connected between opposite ends of the filament 10 and in series relation are a direct-current biasing source 12, the secondary winding of an input transformer 13 and the primary winding of an output transformer 14. The source 12 is so poled that the field produced thereby in the filament tends to accelerate toward the output end, i. e. the right-hand end in Fig. 1, the majority current carriers in the semiconductor. If the body 10 is of N conductivity type, as illustrated in Fig. 1, the majority carriers are electrons and the source is poled as shown in this figure. Conversely, if the filament were of P conductivity type material, the source would be poled in the reverse manner to that shown in Fig. 1.

Figure 2:
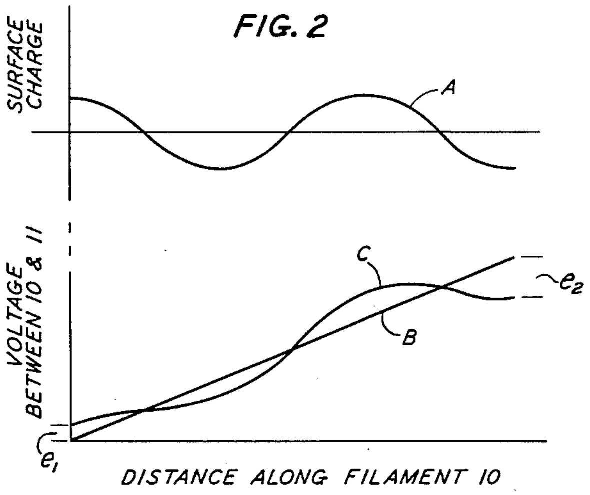
Fig. 2 is a graph portraying certain phenomena involved in the device illustrated in Fig. 1.

When a signal is impressed at the input end, the left-hand end in Fig. 1, a change in surface charge on the filament is produced as a result of the change in the number of carriers in the semiconductor. The added carriers will tend to drift along the filament from the input end to the output end. The phenomena involved are illustrated in Fig. 2 for the case of a sinusoidal input signal impressed between the filament 10 and the plate 11 by way of the transformer 13. Such signal produces along the filament 10 a sinusoidally varying surface charge density as depicted by curve A. The voltage between the filament 10 and strip or plate 11 is composed of two components, one of which, indicated by the line B, increases uniformly along the filament and is due to the bias source 12. Superimposed upon this is the second component, indicated by the curve C, due to the surface charge.

Because of the difference in capacitances at the two ends of the filament, a charge at the output end equal to that at the input end corresponds to a greater voltage, as follows from the elementary relation $$E=\frac{Q}{c}$$

E being voltage, Q the charge and $c$ the capacitance. That is, as illustrated in Fig. 2, the voltage $e_2$ is greater than the voltage $e_1$. Hence, it will be appreciated that in the device voltage and power gains are realized.

In the construction and operation of a device such as illustrated in Fig. 1, certain design considerations are involved. It will be noted that the field along the filament 10 is represented by the slope of the voltage curve C. In order to maintain the rate of carrier flow along the filament substantially constant and thereby to minimize reduction in the signal, it is advantageous that the difference in slope at various points on the curve be small. Thus, the amplitude of the input signal relative to the biasing potential should be limited accordingly.

The design principles of particular moment in the construction of devices in accordance with this invention can be elucidated with the aid of an analytical treatment of an idealized example. We shall therefore suppose that we have a layer of semiconductor of which the conductivity when there is zero normal field is G so that the current along it is $$I=-GdV/dx$$

where $V(x)$ is the voltage along the layer. If the condenser plate 11 is at zero voltage and the layer is a P-type semiconductor (we chose holes for simplicity because their charge is positive) then the added conductance due to V is $\mu CV$ where $\mu$ is the hole mobility and C the capacity per unit length. Hence, the general expression for the current in the $x$-direction is $$I=-(G+\mu CV)dV/dx$$

provided the effects of diffusion can be neglected, which will in general be the case for devices of this sort. If G and C are known functions of $x$, this equation can be solved for the distribution of V for a prescribed steady biasing current I. If an attempt to use a value of I that is too large is made, negative values of $G+\mu CV$ may occur. Such values of I cannot physically be passed through the device without first producing space charge regions as described in the application Serial No. 243,541, filed August 24, 1951, and shall not be considered here.

We shall, therefore, assume that the direct-current bias has been established and shall denote the voltage as $V_0(x)$, conductivity $G+\mu CV_0=G_0(x)$ and the current as $I_0$. Now suppose a small alternating-current signal $V_1(x,t)$ and current $I_1(x,t)$ is also present. The rate of change of $V_1$ with time is evidently $$C(x)\partial V_1(x,t)/\partial t=-\partial I_1/\partial x$$

since the right side represents the rate of accumulation of charge per unit length. The expression for $I_1$ is $$\begin{aligned} I_1(x,t) &= -(G_0+C\mu V_1)\partial(V_0+V_1)/\partial x - I_0 \\ &= -C\mu V_1 \partial V_0/\partial x - G_0 \partial V_1/\partial X \\ &= +Cv_0V_1 - G_0\partial V_1/\partial x \end{aligned}$$

where $$V_0=-\mu dV_0/dx$$

is the direct-current component of drift velocity. Since we are dealing with a small signal theory, terms involving $V_1^2$ have been omitted. These equations lead to an equation for $V_1$, $$C\partial V_1/\partial = -(\partial/\partial x)(Cv_0V_1 - G_0\partial V_1/\partial x)$$

Since we are concerned with showing the conditions that limit the behavior of these devices when there are many cycles of the alternating-current wave along the layer, the derivatives of C, $v_0$, and $G_0$ will make small contributions to the right side compared to those of $V_1$. We shall neglect them in studying the attenuation of $V_1$.

Before doing this, however, we shall show how the equation leads to the voltage gain. The idealized picture is simply that the added charge flows along the layer with velocity $v_0$. Hence the charge $dQ$ entering in time $dt$ at the left side is later found in a range $v_0(x)dt$ at time $t=t_0+\int dx/v_0$. It there produces a charge $$C(x)V_1(x,t)v_0(x)dt=dQ$$

Hence $$V_1(x,t)=(dQ/dt)/C(x)v_0(x)=f(t_0-\int dx/v_0)$$

since $dQ/dt$ is a function of $t_0$, the time of entrance. This expression is readily found to satisfy the first term of the linear approximation.

In order to estimate attenuation effects, we neglect the derivatives of C, $v_0$ and $G_0$ and obtain $$\partial V_1/\partial t = -v_0\partial V_1/\partial x + (G_0/C)\partial^2 V_1/\partial x^2$$

In this the first term on the right simply represents flow of the voltage wave and the second represents a tendency for it to attenuate by diffusion of the wave with diffusion constant $D=G_0C$. In order to exhibit the tendency to attenuate we shall assume that $v_0$ and $G_0$ are independent of $x$ and let $$V_1=\exp(i\omega t+\alpha x)$$

This satisfies the equation provided $$\alpha=(v_0/2D)[1\pm(+4i\omega G_0/Cv_0^2)^{1/2}]$$

The cases of interest correspond to small values of the fraction and lead to $$\alpha=-i\omega/v_0-\omega^2D/v_0^3$$

The first term represents motion with velocity $V_0$ and the second attenuation. If we express this as attenuation per radian of transit angle, corresponding to a motion of $v_0/\omega$, then the attenuation is $$\exp(-\omega D/v_0^2)\theta$$

where $\theta$ is the transit angle in radians, i. e. $\theta=\omega$ times transit time down the layer.

In order for the device to permit operation with many cycles along the layer the inequality $$\omega D/v_0^2<<1$$

must hold since $\theta$ will be much larger than unity. This can be reexpressed by saying that the values of $v_0$, $G_0$ and C must be so chosen that $$v_0^2C/G_0>>1/\omega$$

This relationship permits high frequency operation if very thin layers are employed. If we suppose that the structure consists of a layer of material of specific conductivity $\sigma$ and thickness W so that for a unit width $$G_0=\sigma W$$

separated by a layer of dielectric constant K and thickness L from the condenser plate so that $$C=K\varepsilon_0/L$$

in MKS units, then $$v_0^2K\varepsilon_0/\sigma LW>>1/\omega$$

If we use MKS units and let $$v_0=10^4 \text{ m./sec.}$$

(a value for which the mobility is still linear in the electric field)

$K=16$ and $\sigma=10$ mho/meter, and let $W=10^{-6}$ meters and $L=10^{-5}$ meters, then we find $$\frac{v_0^2K\varepsilon_0}{\sigma LW}=\frac{10^8\times 16\times 8.85\times 10^{-12}}{10\times 10^{-5}\times 10^{-6}}=1.4\times 10^8 \text{ sec}^{-1}$$

At a frequency of one megacycle, or $\omega=6 \times 10^6$, this would permit a transit angle of 10 radians or more before serious attenuation occurred.

As has been indicated hereinabove, although in the specific embodiment of the invention illustrated in Fig. 1 the filament 10 is shown as of N conductivity type, it may be of P conductivity type. Also, although in this embodiment the strip or plate 11 is shown as flat, it may be curved, specifically concave upward in Fig. 1. Further, although the filament 10 and plate 11 are shown as separated by air, they may be spaced by a solid dielectric such as, for example, mica, barium titanate or polystyrene.

In the embodiment of this invention illustrated in Fig. 3, the semiconductive element, for example of germanium or silicon, comprises a layer 10A of N conductivity type between and contiguous with two layers or zones 15A and 15B of P conductivity type. A biasing field is produced longitudinally of the zone or layer 10A, as in the device shown in Fig. 1 and described heretofore, by direct-current sources 12 and 16, the former being greater than the latter. As is evident from Fig. 3, the polarities of the sources 12 and 16 are such that the junctions between the N and P zones are biased in the reverse direction. Hence, space charge regions are produced at these junctions. As disclosed in some detail in the application Serial No. 243,541, filed August 24, 1951, of W. Shockley, the thickness of the space charge region at a PN junction varies in like manner as the reverse bias at the junction. Also the capacitance of such region varies in like manner as the thickness. Hence, it will be appreciated that in the device illustrated in Fig. 3, the capacitance per unit area of each PN junction decreases from the input end to the output end of the semiconductive body. Thus, in the device illustrated in Fig. 3, signals impressed at the input end induce charges on both boundaries of the N zone facing the P zones and these charges flow toward the output end to produce signal gain as in the device shown in Fig. 1. A particular feature of the construction illustrated in Fig. 3 is the absence of surface states at the mentioned boundaries of the N zone which might tend to trap the charges and thereby attenuate the signal.

In the embodiment of this invention illustrated in Fig. 4, carrier flow in two adjacent layers or zones of opposite conductivity type is utilized. The semiconductive body, for example of germanium or silicon, comprises contiguous N zones 10A and 10B and P zones 15A and 15B in alternate relation and defining junctions $J_1$, $J_2$ and $J_3$. These junctions are biased in the reverse direction by the sources 12A, 12B, 16A and 16B, poled as indicated in the drawing. The biases due to the sources 12 are large in comparison to those due to the sources 16 whereby the thickness of the space charge region at each junction increases toward the output end of the semiconductive body, that is the right-hand end in Fig. 4. Thus, the capacitance per unit area of each of the junctions decreases toward the output end of the body.

The input transformer is divided as shown to provide two in phase input signals; the output transformer is divided similarly.

As in the device illustrated in Fig. 3, in that illustrated in Fig. 4, when signals are impressed upon the zone 10A from the secondary winding of transformer phase 13A, charges are induced at the left-hand end of this zone and at the faces thereof at the junctions $J_1$ and $J_2$. These charges flow to the output end and result in output signals at the primary winding of transformer part 14A. In like manner, surface charges are produced at the left-hand end of the P zone 15A at the junctions $J_1$ and $J_3$ and are drawn to the output end of this zone to produce variations in the output of transformer phase 14B.

Because the zones 10A and 15A are of opposite conductivity type, the majority carriers in the two are of opposite sign, being electrons in zone 10A and holes in zone 15A. Hence, the surface charges on the two zones likewise are of opposite sign. The mobilities of the carriers, electrons and holes, are different so that the biases due to the sources 12 and 16 sholud be correlated to produce equal drift velocities for the surface charges in the two zones whereby the outputs of these two zones will be in phase. A particular feature of such concomitant drift of the charges in the two zones is the reduction in the tendency of the surface charges to spread out and reduction also in the forces tending to retard flow of these charges to the output end of the N and P zones 10A and 15A.

Although specific embodiments of the invention have been shown and described, it will be understood that they are but illustrative and that various modifications may be made therein without departing from the scope and spirit of the invention.

What is claimed is:

A signal translating device comprising an elongated body of semiconductive material having therein four longitudinally extending contiguous zones, adjacent zones being of opposite conductivity type, means for producing at each of the junctions between adjacent zones a space charge region which increases in thickness from one end of said body to the other, said means including source means biasing each of said junctions in the reverse direction, input circuit means for inducing charges on the two intermediate zones adjacent said one end of said body, and an output circuit connected to said intermediate zones at the other end of said body.

References Cited in the file of this patent

UNITED STATES PATENTS

| | | |
|---|---|---|
| 2,126,915 | Norton | Aug. 16, 1938 |
| 2,517,960 | Barney | Aug. 8, 1950 |
| 2,600,500 | Haynes et al. | June 17, 1952 |

OTHER REFERENCES

Physical Review, pp. 232–233, July 15, 1948.

Electronics, pp. 68–71, September 1948.

"Audio Engineering," pp. 68–71, September 1948.

Shockley text: "Electrons and Holes in Semi-Conductors," p. 30, published 1950.